(12) United States Patent
Palanisamy et al.

(10) Patent No.: US 7,996,434 B2
(45) Date of Patent: Aug. 9, 2011

(54) SYSTEM AND METHOD FOR CREATING AND MANAGING UNIVERSALLY UNIQUE IDENTIFIERS FOR SERVICES

(75) Inventors: Muthukumar S. Palanisamy, Sunnyvale, CA (US); Catherine Betz Lippert, Solon, OH (US); David S. Keyes, Clinton, OH (US)

(73) Assignee: Oracle International Corporation, Redwood Shores, CA (US)

( * ) Notice: Subject to any disclaimer, the term of this patent is extended or adjusted under 35 U.S.C. 154(b) by 351 days.

(21) Appl. No.: 12/370,030

(22) Filed: Feb. 12, 2009

(65) Prior Publication Data

US 2010/0205224 A1    Aug. 12, 2010

(51) Int. Cl.
*G06F 17/30* (2006.01)
(52) U.S. Cl. .................. 707/796; 707/736; 707/707
(58) Field of Classification Search .............. 707/610, 707/627, 706, 707, 709, 736, 795, 796; 709/203, 709/246, 231
See application file for complete search history.

(56) References Cited

U.S. PATENT DOCUMENTS

| | | | |
|---|---|---|---|
| 7,457,870 B1 * | 11/2008 | Lownsbrough et al. | 709/224 |
| 7,656,822 B1 * | 2/2010 | AbdelAziz et al. | 370/255 |
| 2004/0064554 A1 * | 4/2004 | Kuno et al. | 709/225 |
| 2005/0091174 A1 * | 4/2005 | Akkiraju et al. | 705/75 |
| 2005/0198188 A1 * | 9/2005 | Hickman | 709/217 |
| 2005/0198206 A1 * | 9/2005 | Miller et al. | 709/219 |
| 2006/0026125 A1 * | 2/2006 | Breeds | 707/2 |
| 2007/0005733 A1 * | 1/2007 | Allamaraju | 709/219 |
| 2007/0143214 A1 * | 6/2007 | Colgrave | 705/51 |
| 2007/0168479 A1 * | 7/2007 | Bean et al. | 709/223 |
| 2007/0209042 A1 * | 9/2007 | Mullan et al. | 719/328 |
| 2007/0226262 A1 * | 9/2007 | Akkiraju et al. | 707/104.1 |
| 2007/0271554 A1 * | 11/2007 | Fletcher et al. | 717/147 |
| 2009/0204612 A1 * | 8/2009 | Keshavarz-Nia et al. | 707/6 |

OTHER PUBLICATIONS

Oasis UDDI, "Introduction to UDDI: Important Features and Functional Concepts," 11 pages. (Oct. 2004).
Oasis, "Using WSDL in a UDDI Registry, Version 2.0.2—Technical Note," 40 pages. (2004).

* cited by examiner

*Primary Examiner* — Cam-Linh Nguyen
(74) *Attorney, Agent, or Firm* — Fliesler Meyer LLP

(57) ABSTRACT

A method is provided for creating a Universally Unique Identifier (UUID) for a web service. The UUID is stored in service metadata associated with the web service. The UUID can then be used to track services and correlate service information between multiple systems. In accordance with an embodiment, a method is provided for publishing Universal Description Discovery and Integration (UDDI) service information from a metadata repository to a service registry. In accordance with an embodiment, a method is provided for receiving Universal Description Discovery and Integration (UDDI) service information from a service registry into a metadata repository.

19 Claims, 18 Drawing Sheets

WSDL Service 'HelloWorldService'

Categories

| tModel | key name | key value |
|---|---|---|
| service:serviceId | service:serviceId | uuid:AD 38E77B |
| management:registeredDate | management:registeredDate | Tue Oct |
| management:state | Managed state | managed |
| uddi-org:wsdl:types | uddi.org:wsdl:types | service |
| uddi-org:xml:localName | uddi-org:xml:localName | HelloWo |
| uddi-org:xml:namespace | uddi-org:xml:namespace | http://ar |
| er:uuid | er:uuid | 492b716 5794200 |
| http://schemas.xmlsoap.org/ws/2003/03/localpolicyreference | Associated Policy | uddi:31d 32a3bc8 |
| management:metrics:availability | Daily (percentage value) | 0 |
| management:metrics:avgResponseTime | Daily (average value in milliseconds) | 0 |
| management:metrics:faults | Daily (number) | 0 |
| management:metrics:requests | Daily (number) | 0 |
| management:metrics:availability | Weekly (percentage value) | 100 |
| management:metrics:avgResponseTime | Weekly (average value in milliseconds) | 36 |
| management:metrics:faults | Weekly (number) | 9 |
| management:metrics:requests | Weekly (number) | 34 |
| management:metrics:availability | Monthly (percentage value) | 100 |
| management:metrics:avgResponseTime | Monthly (average value in milliseconds) | 69 |
| management:metrics:faults | Monthly (number) | 15 |
| management:metrics:requests | Monthly (number) | 34 |

FIG. 7

SYSTEM AND METHOD FOR CREATING AND MANAGING UNIVERSALLY UNIQUE IDENTIFIERS FOR SERVICES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention is related to Service-Oriented Architecture and integration between metadata repositories that store service metadata and service registries that support UDDI.

BACKGROUND

Service-Oriented Architecture (SOA) is based on the deconstruction of yesterday's monolithic applications and information technology infrastructure into a matrix of discrete, standards-based, network-accessible services. The process of transformation requires the organization, identification, and repurposing of applications and business processes of the existing information technology infrastructure. The transformation to SOA begins with an analysis of the IT infrastructure to identify applications, business processes, and other software assets that become services, or otherwise support the SOA.

Metadata is data about data, or more specifically, information about the content of the data; service metadata is information about the services in an SOA. Service producers use service metadata to describe what service consumers need to know to interact with the service producers. Service metadata is stored in a metadata repository by service producers and then accessed by service consumers. A metadata repository provides visibility into the portfolio of assets, the traceability of the assets within that portfolio, the relationships and interdependencies that connect the assets to each other, the policies that govern use of the assets, and the projects that produce the assets and consume the assets.

A Service-Oriented Architecture implements the delivery of software services to clients over a network. System resources are made available as loosely-coupled, independent services. Services are made available through platform- and programming language-independent interfaces that are defined in a standardized way. Services are available both to clients and other services.

A web service is a software component that accepts XML-based requests from a client to perform operations. In most cases, a web service returns an XML-based response after processing the request. Web services are language-, platform-, and location-independent. A client can contact a web service that is written in a different programming language, running on a different platform, and located across the Internet.

Each web service has at least one URL at which the web service can be contacted. These URLs are called endpoints (ports in WSDL 1.1). Endpoints offer one or more operations, which define specific formats for request and response messages. In most cases, all endpoints on a service define the same set of operations.

UDDI is an acronym for Universal Description, Discovery, and Integration—a platform-independent, XML-based registry for publishing and discovering services of a service-oriented architecture (SOA) within an enterprise. UDDI is an open industry initiative (sponsored by OASIS) enabling businesses to publish service listings and discover each other and define how the services or software applications interact over the Internet. UDDI is used in SOA for runtime interoperability between systems for services and related assets, policies, and metadata.

SUMMARY

A method is provided for creating a Universally Unique Identifier (UUID) for a web service. The UUID is stored in service metadata associated with the web service. The UUID can then be used to track services and correlate service information between multiple systems. In accordance with an embodiment, a method is provided for publishing Universal Description Discovery and Integration (UDDI) service information from a metadata repository to a service registry. In accordance with an embodiment, a method is provided for receiving Universal Description Discovery and Integration (UDDI) service information from a service registry into a metadata repository.

BRIEF DESCRIPTION OF THE DRAWINGS

FIG. 7 shows examples of performance data associated with tModel categorizations, in accordance with one embodiment.

DETAILED DESCRIPTION

Figure 1:
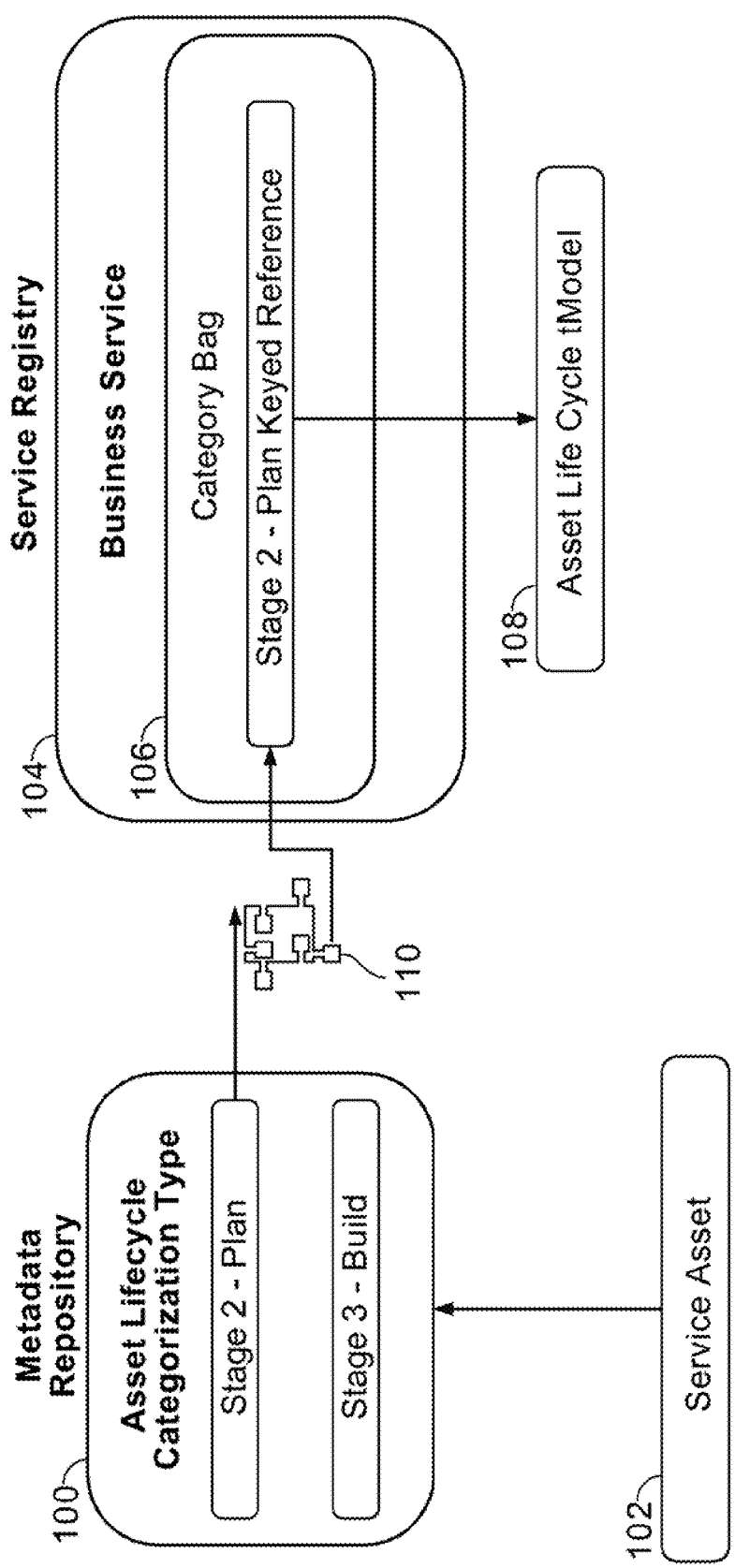
FIG. 1 illustrates wiring UDDI from a metadata repository into a service registry, in accordance with an embodiment.

It is not enough to simply put reusable service metadata assets into a metadata repository. There are additional problems with service metadata reuse. Service metadata assets are developed in an integrated development environment. Services are executed by enterprise service buses and process engines. Design time service metadata assets are often stored in a metadata repository to increase reuse of the assets and to promote governance. Run time service metadata assets are often located through a service registry. Identifying the same service in all of these environments is a difficult problem.

UUIDs for Services

A Universally Unique Identifier (UUID) is an identifier standard. The intent of UUIDs is to enable distributed systems to uniquely identify information without significant central coordination. A UUID is used to identify something with reasonable confidence that the identifier will never be unintentionally used by anyone for anything else. Information labeled with UUIDs can therefore be later combined into a single database without needing to resolve name conflicts.

UUID plays a major role in the service lifecycle governance when a service and its associated metadata are published to different systems and consumed from different systems. There are challenges faced when correlating the services that live in the different systems. Following are some of the high level use cases where a UUID may be utilized.

When a service is created in a design time integrated development environment (IDE), a UUID is generated and annotated in the metadata.

When a service is synchronized to a metadata repository, the UUID is read by a synchronization module and a service asset is created in the metadata repository with the UUID that is harvested from the service metadata. At this stage, the service asset in the metadata repository may or may not have concrete information.

Enterprise service buses support the use case where a proxy service can be published to a UDDI registry from a web console. The same service can be published to more than one UDDI registry, one registry per lifecycle and the services in all those registries will have the same UUID.

In one embodiment, when a service is published to the UUDI registry, the UUID is stored in the service registry in a data structure. In one embodiment, the data structure is an agreed-upon UUID tModel. A tModel is a data structure that can be used to represent technical specifications such as service types, bindings, and wire protocols and can also be used to categorize technical specifications and services.

When a service from the UDDI registry is synchronized back to the metadata repository so that the concrete information can be updated, the UUID is the only way the services can be correlated. Once the services are correlated, the concrete endpoints can be created in the metadata repository, one per lifecycle. Also, if performance metrics are deposited in the UDDI registry by a monitoring system, the metrics can be updated in the metadata repository.

Business services that are "proxied" by a service bus to be tied to the real service can be tracked. For example, when a service provided by a BPEL process manager process is exposed as a service and published to a UDDI registry. When this Service is discovered by the service bus so that it can "proxy" for the BPEL process manager process, the UUID of the BPEL process manager service come along with the service metadata so that the dependency can be tracked in the metadata repository from the service bus service to the BPEL process manager service. In one embodiment, not all of the services will have the UUID information in the registry.

When an enterprise service bus publishes metrics to a monitoring system, the UUID is sent along with the metrics data. The UUID is used as the correlation mechanism when the metrics are updated to the metadata repository.

When the service is synchronized directly from the containers, the services can be correlated in the metadata repository and the concrete information can be updated. This involves the UUID being annotated in the WSDL.

When services are deployed using ANT based scripts or other deployment mechanisms, the concrete deployment information is updated in the metadata repository and correlated using UUID.

Correlating services and artifacts such as XSDs, WSDLs, BPEL, etc. in a service metadata repository presents difficult challenges. If duplicate entities are created every time someone submits artifacts, there would be discrepancies in the impact analysis use cases due to the duplicate entities. To solve this problem, an algorithm can be used to calculate a "FingerPrint" to uniquely identify an artifact by normalizing the artifact using XML canonicalization and other rules. In accordance with an embodiment, this fingerprint can be calculated using Software File Identification technology (SFID) described in pending U.S. patent application Ser. No. 11/106, 469 entitled "DATA OBJECT IDENTIFICATION, TRACKING, FILTERING AND MONITORING USING DATA OBJECT FINGERPRINTS," filed Apr. 15, 2005 and incorporated by reference in its entirety. Before submitting a new artifact, a SFID associated with an asset can be compared against existing SFIDs in the repository, to check for duplicates.

While SFID reduces duplicate entities, the SFID algorithm doesn't identify different versions of the same artifact. However, if a UUID is present in a BPEL artifact for example, then using a combination of "FingerPrint" and the UUID, it should be able to automatically identify a different version of the BPEL artifact.

A UUID is different from a digital watermark. For digital watermarks, a watermark is embedded in a signal. The signal with the watermark is then transmitted from a sender to a recipient. The recipient can then use the watermark in the signal for authentication or identification purposes. However, a service is not transmitted from a sender to a recipient, instead a service is deployed. Following deployment, the service processes requests and returns results to the requestors. Requestors who receive results from a service do not have access to the UUID. As a further difference, the UUID is embedded into service metadata, not into the service itself, unlike a digital watermark for a signal, which is embedded into the signal, not into signal metadata.

A UUID is also different from a primary key for a table in a relational database. In a relational database, a primary key is a key to uniquely identify each row in a table. An example of a primary key for a relational database table would be a social security number or an ISBN number. In contrast, the UUID is stored in service metadata associated with a service; the UUID is not a column in a database table that uniquely identifies a row in that database table.

In one embodiment, the system performs introspection to determine a UUID for a service by introspecting service metadata to identify the UUID. In accordance with an alternative embodiment, a service notifies a system regarding the presence of the UUID.

In accordance with a specific embodiment, FIG. 1 illustrates a method for wiring UDDI service metadata from a metadata repository into a service registry. Metadata Repository 100 stores service metadata information that is associated with service asset 102. Service metadata asset 102 is categorized by Asset Lifecycle Categorization Types, including Stage 2—Plan and Stage 3—Build (Stage 1 of the asset lifecycle is not shown in the figure). Service Registry 104 contains Business Service 106. Business Service 106 includes a Category Bag containing Stage 2—Plan Keyed Reference associated with Asset Life Cycle tModel 108. A hidden Unique Universal Identifier 110 enables metadata asset 102 stored in metadata repository 100 to be synchronized with business service 106 in service registry 104.

Figure 2A:
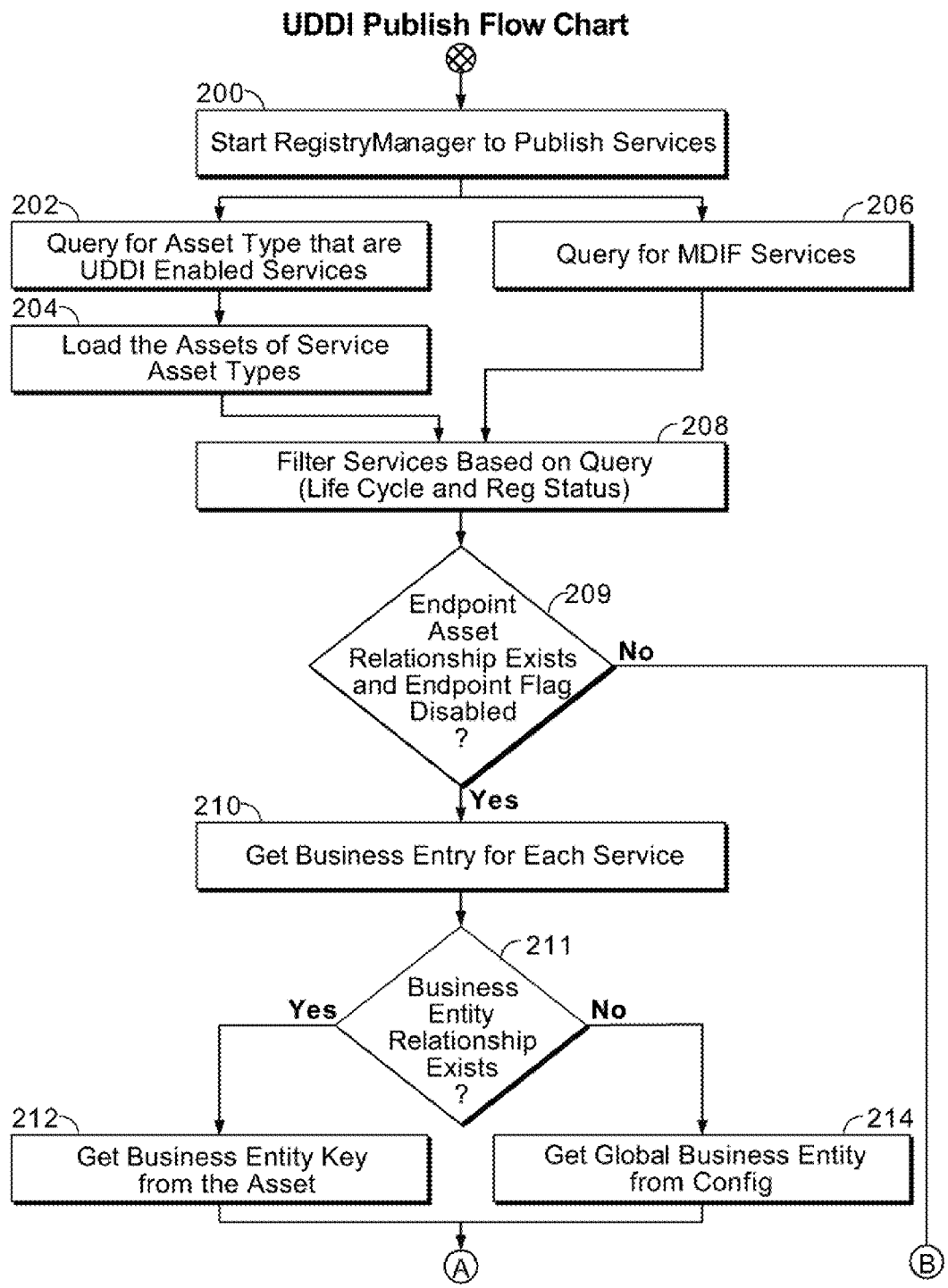
FIGS. 2A and FIG. 2B show a flow chart for publishing service metadata from a metadata repository into a service registry, in accordance with an embodiment.
Figure 2B:
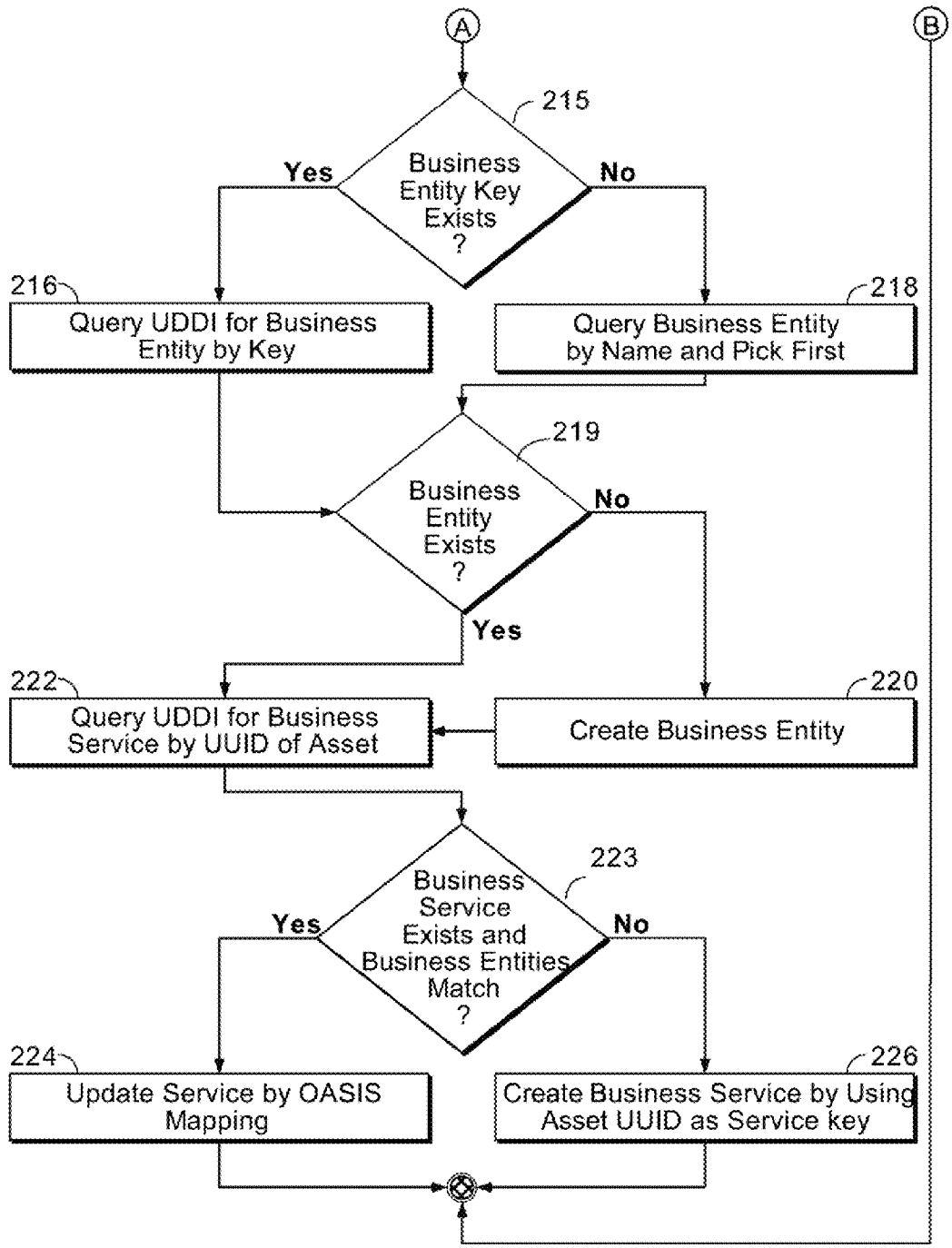

In accordance with a specific embodiment, FIG. 2A and FIG. 2B show a flow chart for publishing service metadata from a metadata repository into a service registry. In step 200, a RegistryManager is started to publish service metadata from a metadata repository into a service registry. In step 202, the system queries for metadata service asset types that are UDDI enabled services. In step 204, the system loads the result list of metadata service asset types. Alternatively, in step 206, the system queries for services that support the Metadata Interoperability Framework (MDIF). In step 208, the identified services are filtered based on a query for lifecycle and asset registration status. In step 209, if a service endpoint asset relationship exists and an endpoint flag is disabled, then in step 210 a business entity is obtained for each service asset. In step 211, if a business entity relationship exists, in step 212 the business entity key is obtained from the service metadata asset. If a business entity relationship does not exist, then in step 214 a global business entity is obtained from configuration information. In step 215, if the business entity key exists, in step 216 the service registry is queried for the business entity using the business entity key. If the business entity key does not exist, then in step 218 the service registry is queried for the business entity by name. In one embodiment, the first service is selected if there are multiple services with the same name. If a business entity exists, then in step 222 the UDDI service registry is queried for the business service by the UUID of the metadata asset. If a business entity does not exist, then in step 220 a business entity is created in the UDDI service registry and in step 222 the UDDI service registry is queried for the business service by the UUID of the metadata asset. If the business service exists and business entities match, then in step 224 the service is updated by OASIS mapping. If the business service exists and the business entities do not match, then in step 226 the business service is created using the asset UUID as a service key.

Figure 3A:
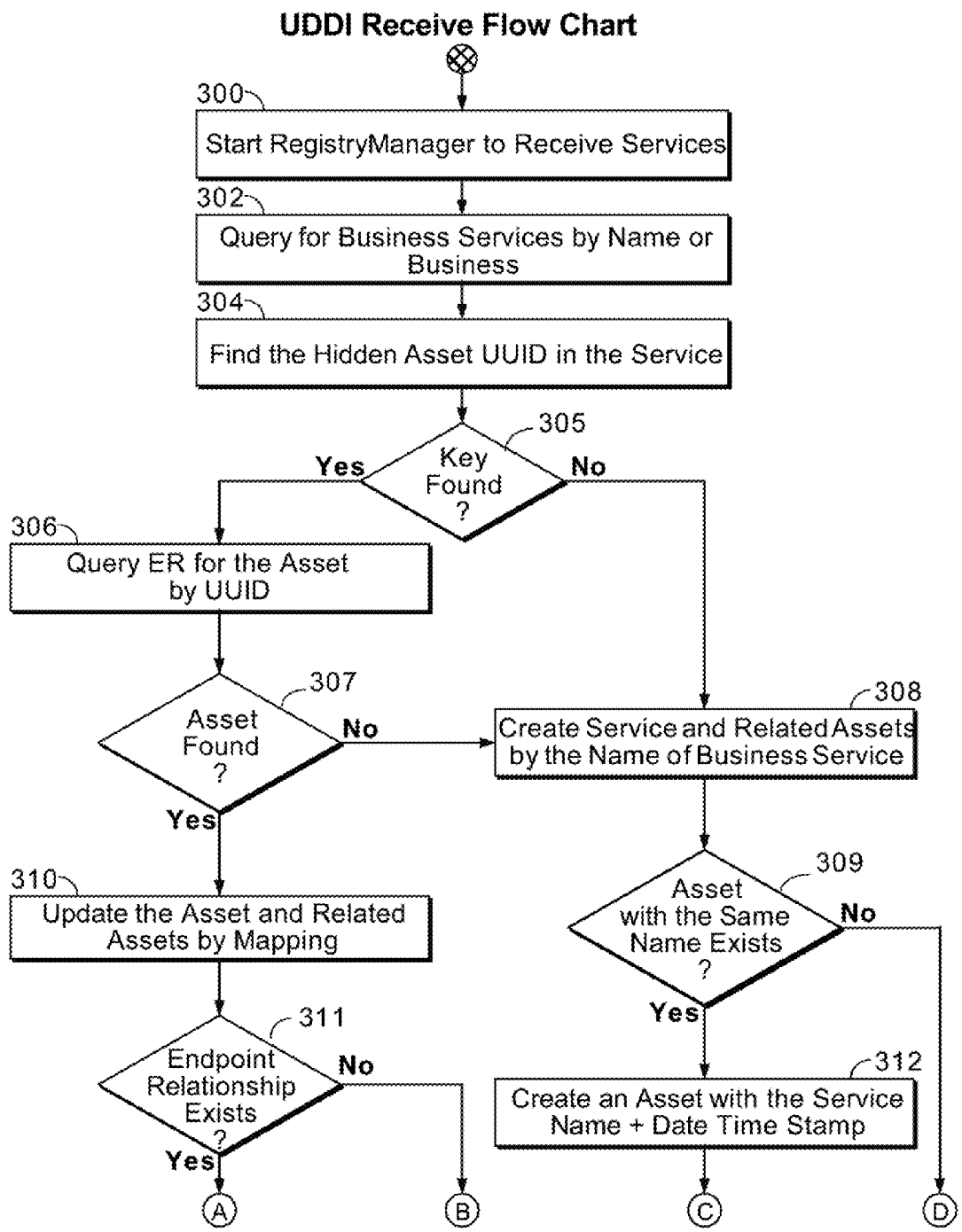
FIGS. 3A and FIG. 3B show a flow chart for receiving service metadata from a service registry into a metadata repository, in accordance with an embodiment.
Figure 3B:
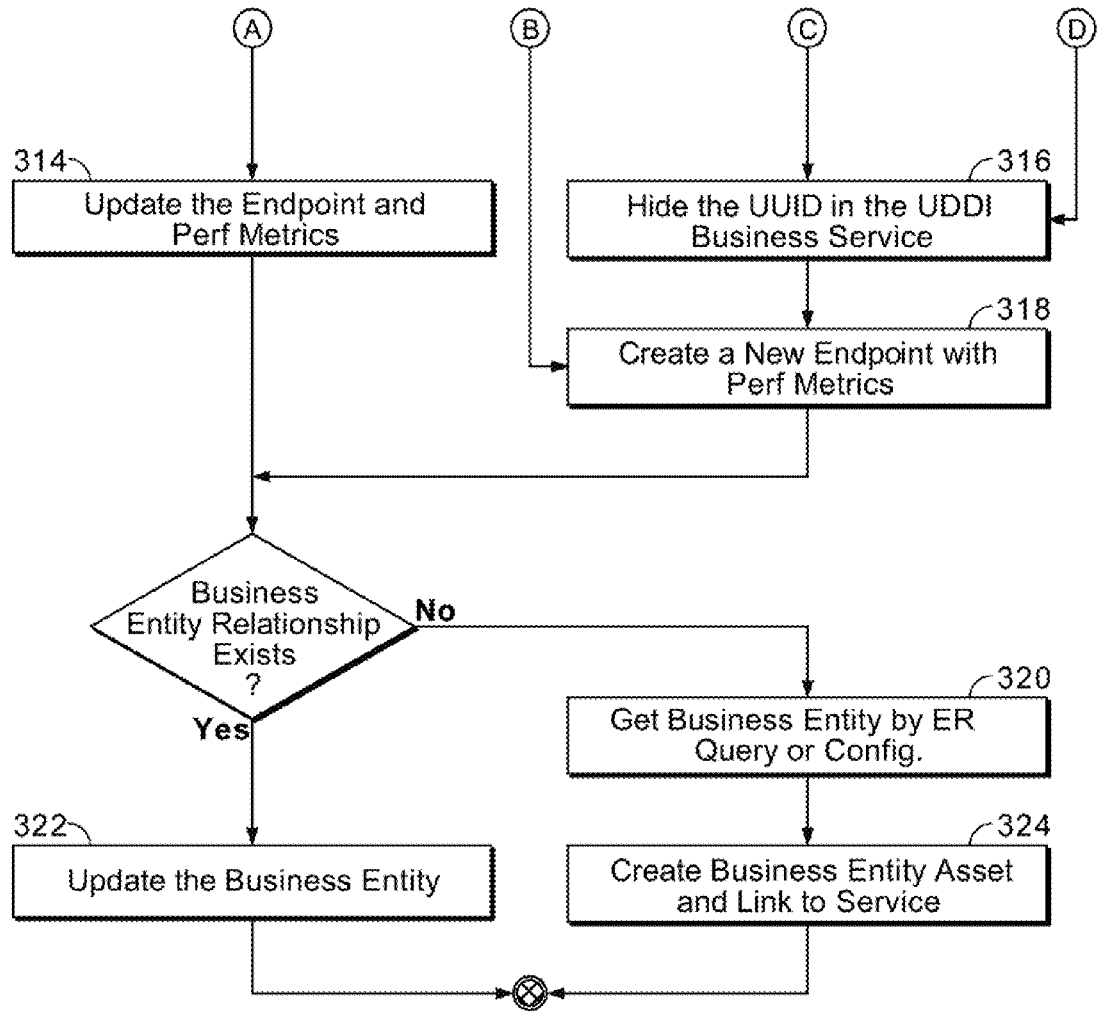

In accordance with a specific embodiment, FIGS. 3A and FIG. 3B show a flow chart for receiving service metadata from a service registry into a metadata repository. In step 300, a RegistryManager is started to receive service metadata from a service registry into a metadata repository. In step 302, the service registry is queried for a business service by name or business. In step 304, the service returned by the query is searched for a hidden asset UUID. If a hidden asset UUID key is found, then in step 306 the metadata repository is queried for a corresponding metadata asset using the UUID key. If a hidden asset UUID key was not found, or if the key was found but no corresponding asset was found using the UUID key, then in step 308 a new service asset is created in the metadata repository using the name of the business service. In step 312, if an asset with the service name already exists, then a date time stamp is appended to the name of the new asset. In step 316, the UUID key for the new asset is hidden in the business service in the UDDI service registry. In step 318, a new service endpoint asset is created in the metadata repository with performance metrics. Alternatively, if the hidden asset UUID key was found in the service and the corresponding asset was identified in the metadata repository, then in step 310 the asset and related assets are updated by mapping. If an endpoint relationship does not exist, then in step 318 a new endpoint asset is created with performance metrics. If an endpoint relationship already exists, then in step 314 the endpoint asset is updated with performance metrics. If a business entity relationship exists, then in step 322 the business entity is updated in the metadata repository. If a business entity relationship does not exist, then in step 320 the business entity is obtained by querying the metadata repository or from the configuration information, and in step 324, the business entity asset is created and linked to the service in the metadata repository.

Figure 4:
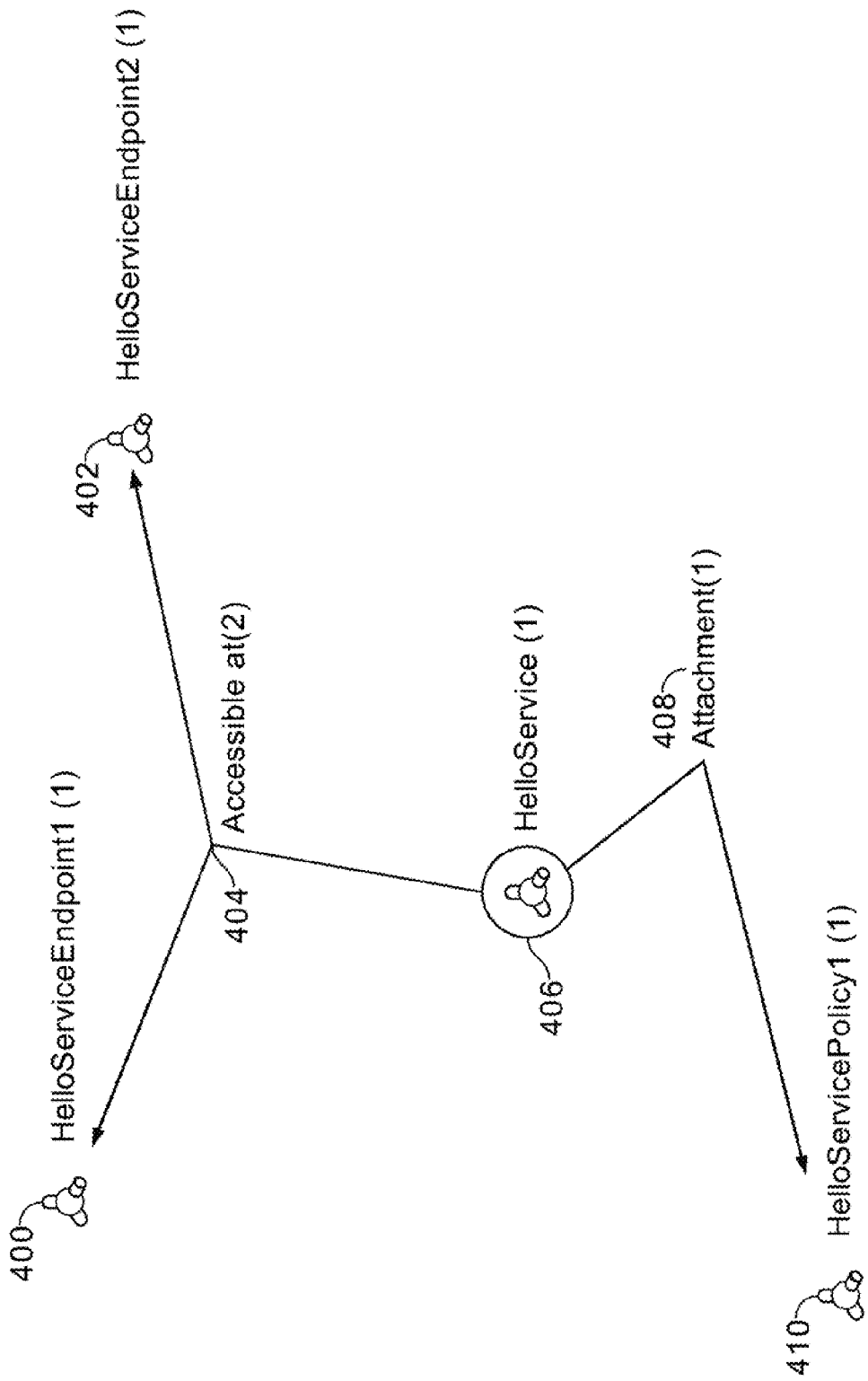
FIG. 4 shows an example of a service with a policy and two endpoints.

FIG. 4 shows an example of a service asset as it may be viewed by a user using a client browser with the metadata repository. In this example, the service asset has a policy and two endpoints. HelloService 406 is accessible 404 at two deployed endpoints, HelloServiceEndpoint1 400 and HelloServiceEndpoint2 402. HelloService 406 has an attachment 408 which is HelloServicePolicy1 410. As discussed above, both endpoints may contain the same UUID in their associated metadata because they are the same service.

Figure 5:
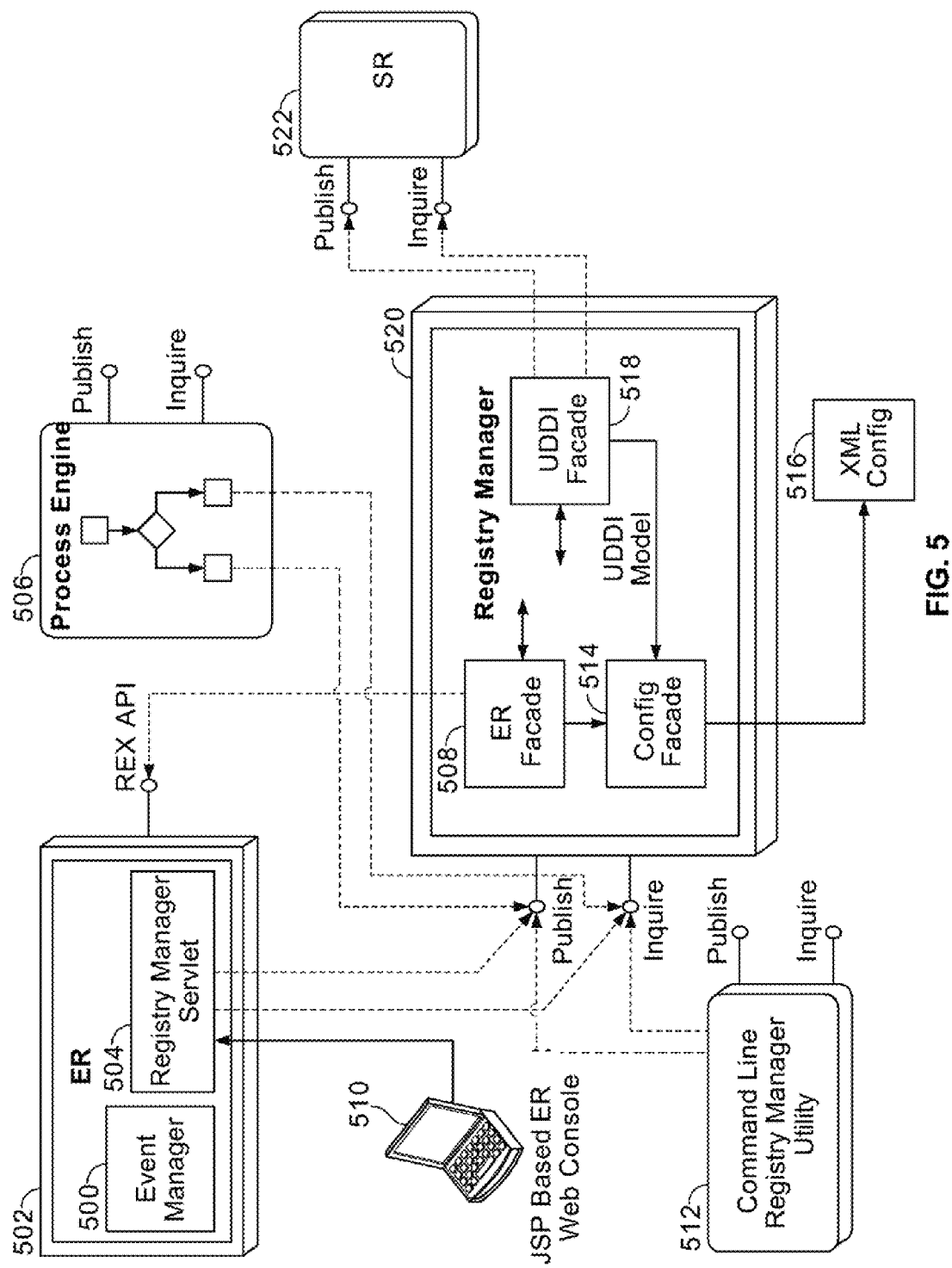
FIG. 5 shows an example of an architecture diagram for one embodiment.

FIG. 5 shows an architecture diagram in accordance with one embodiment. Metadata repository 502 contains Event Manager 500 and Registry Manager Servlet 504. A JSP based Web Console 510 enables users to interact with Registry Manager Servlet 504. The Registry Manager Servlet 504 interacts with Registry Manager 520 through a Repository Extension API (REX). Alternatively, a command line registry manager utility 512 can directly interact with the Registry Manager 520. Alternatively, process engine 506 directs publish and inquire workflows that interact with Event Manager 500, Registry Manager 520, and Service Registry 522. In one embodiment, registry manager 520 uses the Façade design pattern, including a metadata repository façade 508, a config façade 514, and a UDDI service registry façade 518. In one embodiment, the config façade 514 is between the Registry Manager 520 and XML configuration information 516. In accordance with one embodiment, the metadata repository façade 508 is between the metadata repository 502 and the Registry Manager 520. In accordance with one embodiment, the UDDI service registry façade 518 is between the Service Registry 522 and the Registry Manager 520.

Figure 6:
FIG. 6 shows an example of a tModel representing a categorization, in accordance with one embodiment.

FIG. 6 shows an example in accordance with one embodiment of a tModel 600 representing a categorization. A tModel describes documentation elements for accessing a service. UDDI tModels can be used to represent interfaces, classification information which can then be added into interface tModels to make search easier, and tModels can be used as namespaces to add more meaning into a UDDI data structure. Two categorization types are shown in the categorization mappings in FIG. 6. The first example type name is NAICS with the specific category of "Finance and Insurance." The second example type name is "AssetLifecycleStage," with the specific category of "Stage 3—Build." In each example, additional categories could be provided for the specific type.

FIG. 7 shows examples in accordance with one embodiment of performance data associated with WSDL service 700. The tModel column shows categories, the key name column shows units for the data, and the key value column shows values for the data. In this example, the tModel is being used to synchronize performance metrics between the metadata repository and a system that monitors the performance of the run-time services.

Figure 8:
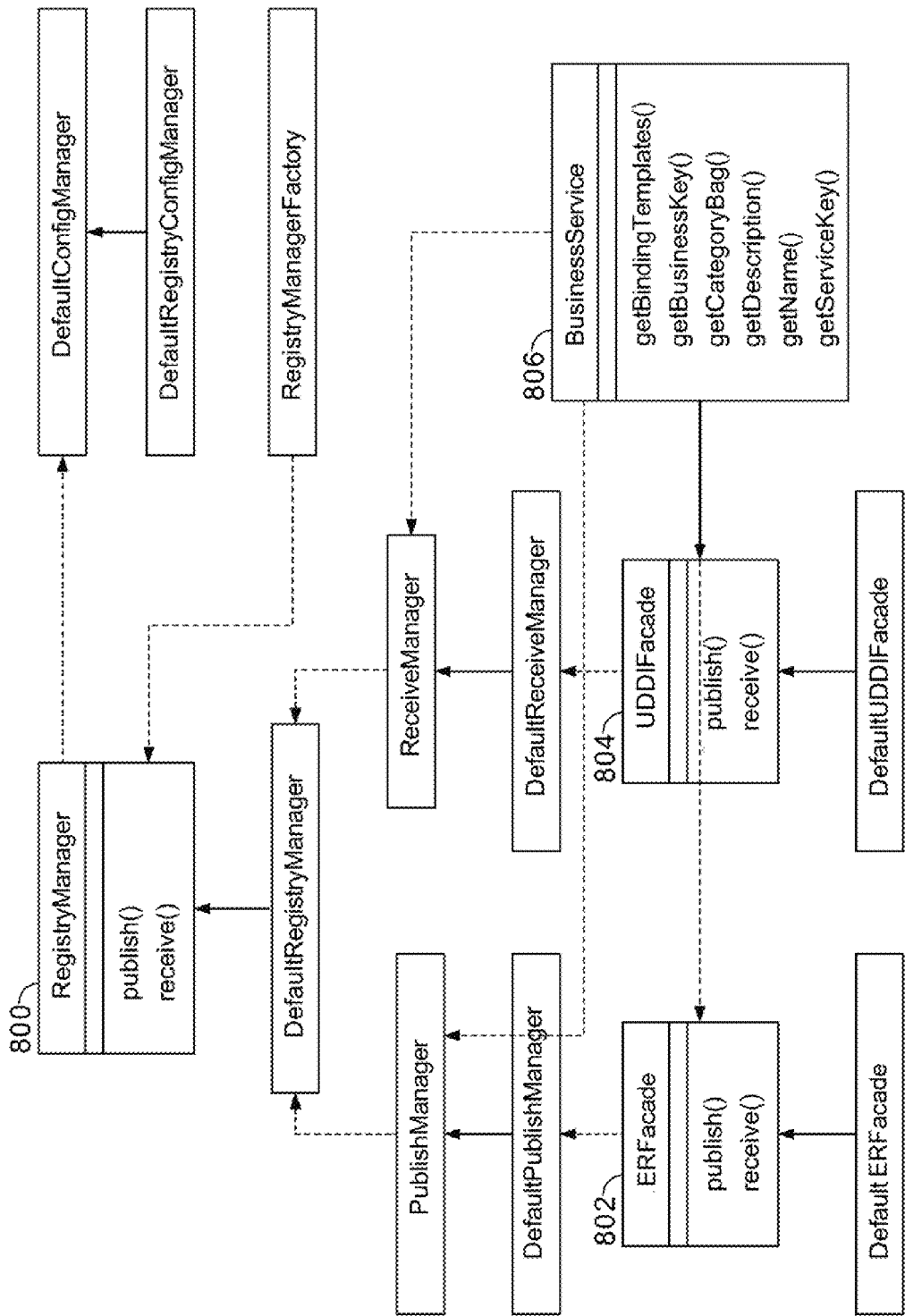
FIG. 8 illustrates a class diagram, in accordance with one embodiment.

FIG. 8 illustrates an example of a class diagram in accordance with one embodiment. RegistryManager 800 provides publish and receive functionality to publish service metadata from the metadata repository to the service registry and to receive service metadata from the service registry into the metadata repository. ERFacade 802 is interposed between the metadata repository and the RegistryManager 800. UDDIFacade 804 is interposed between the service registry and the RegistryManager 800. BusinessService 806 represents the business service that is being published or received.

Figure 9:
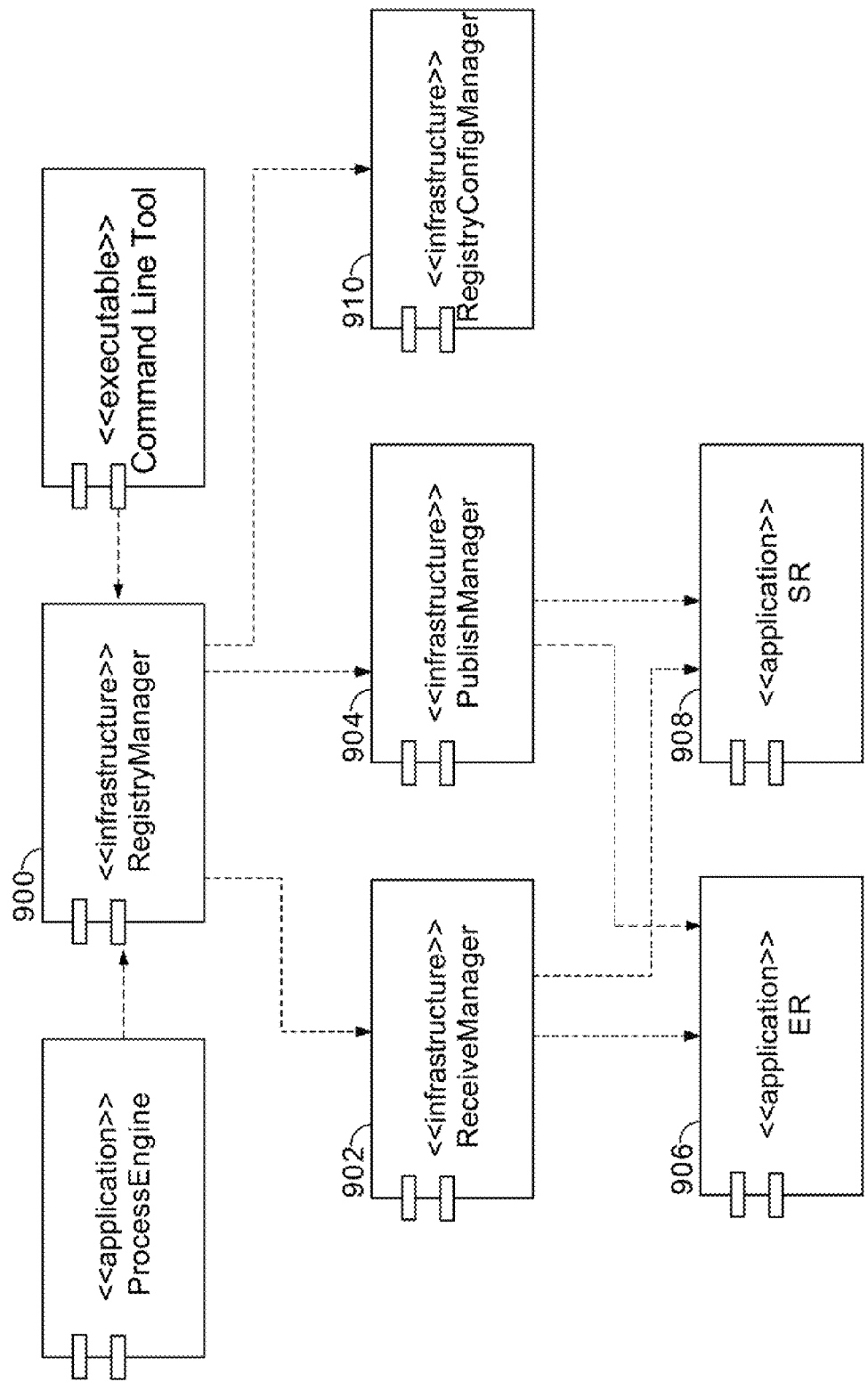
FIG. 9 illustrates a class diagram, in accordance with one embodiment.

FIG. 9 illustrates an example of a class diagram in accordance with one embodiment. RegistryManager 900 can be started by either the process engine or the command line tool. ReceiveManager 902 receives service metadata from service registry 908 into metadata repository 906. PublishManager 904 publishes service metadata from metadata repository 906 into service registry 908. RegistryConfigManager 910 stores XML configuration information for RegistryManager 900.

Figure 10:
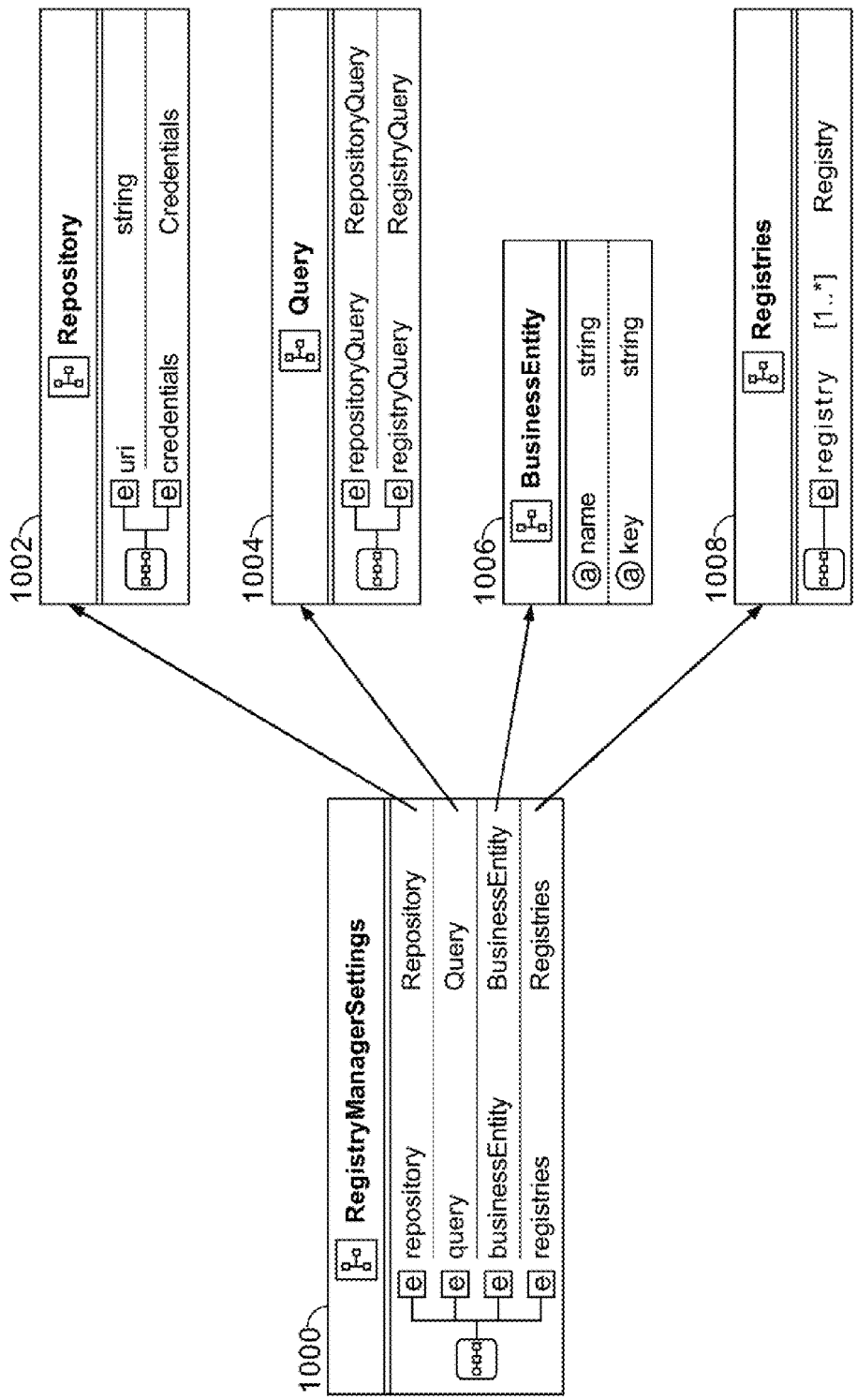
FIG. 10 illustrates a class diagram, in accordance with one embodiment.

FIG. 10 illustrates an example of a class diagram in accordance with one embodiment. The RegistryManagerSettings 1000 datatype contains Repository 1002, Query 1004, BusinessEntity 1006, and Registries 1008. The Repository 1002 datatype, contained in the RegistryManagerSettings 1000, itself includes settings for URI and credentials. The Query 1004 datatype, contained in the RegistryManagerSettings 1000 datatype, includes settings for a RepositoryQuery and a RegistryQuery. The BusinessEntity 1006 datatype, contained within the RegistryManagerSettings 1000 datatype, includes a name and a key. The Registries 1008 datatype, contained within the RegistryManagerSettings 1000 datatype, provides one or more references to registries.

Figure 11:
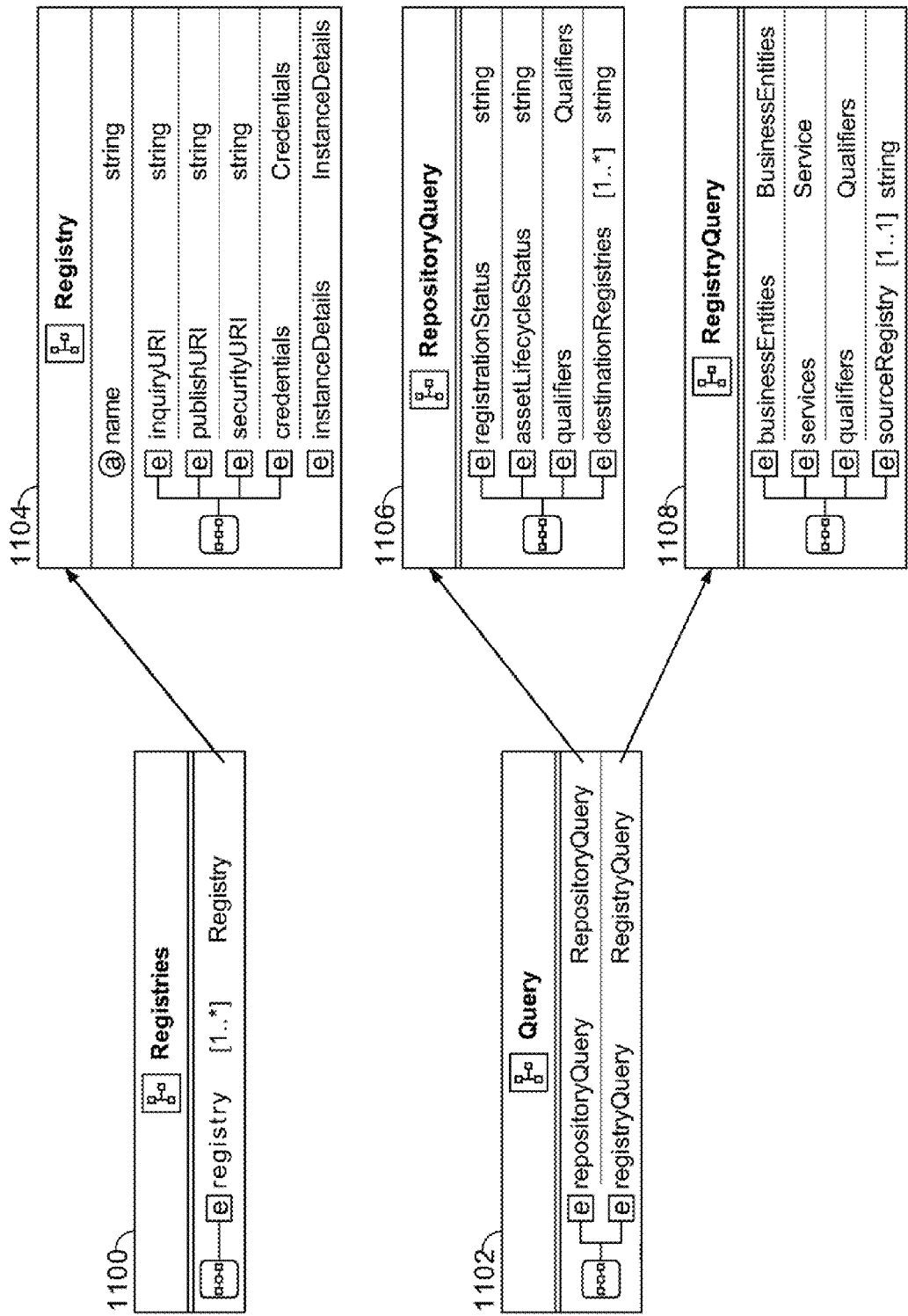
FIG. 11 illustrates a class diagram, in accordance with one embodiment.

FIG. 11 illustrates an example of a class diagram in accordance with one embodiment. Registries 1100 include one or more references to registry 1 104. Registry 1104 includes a name, inquiryURI, publishURI, securityURI, credentials, and instance details. Query 1102 includes repositoryQuery 1106 and registryQuery 1108. RepositoryQuery 1106 includes registrationStatus, assetLifecycleStatus, qualifiers, and one or more destinationRegistries. RegistryQuery 1108 includes businessEntities, services, qualifiers, and a sourceRegistry.

Figure 12:
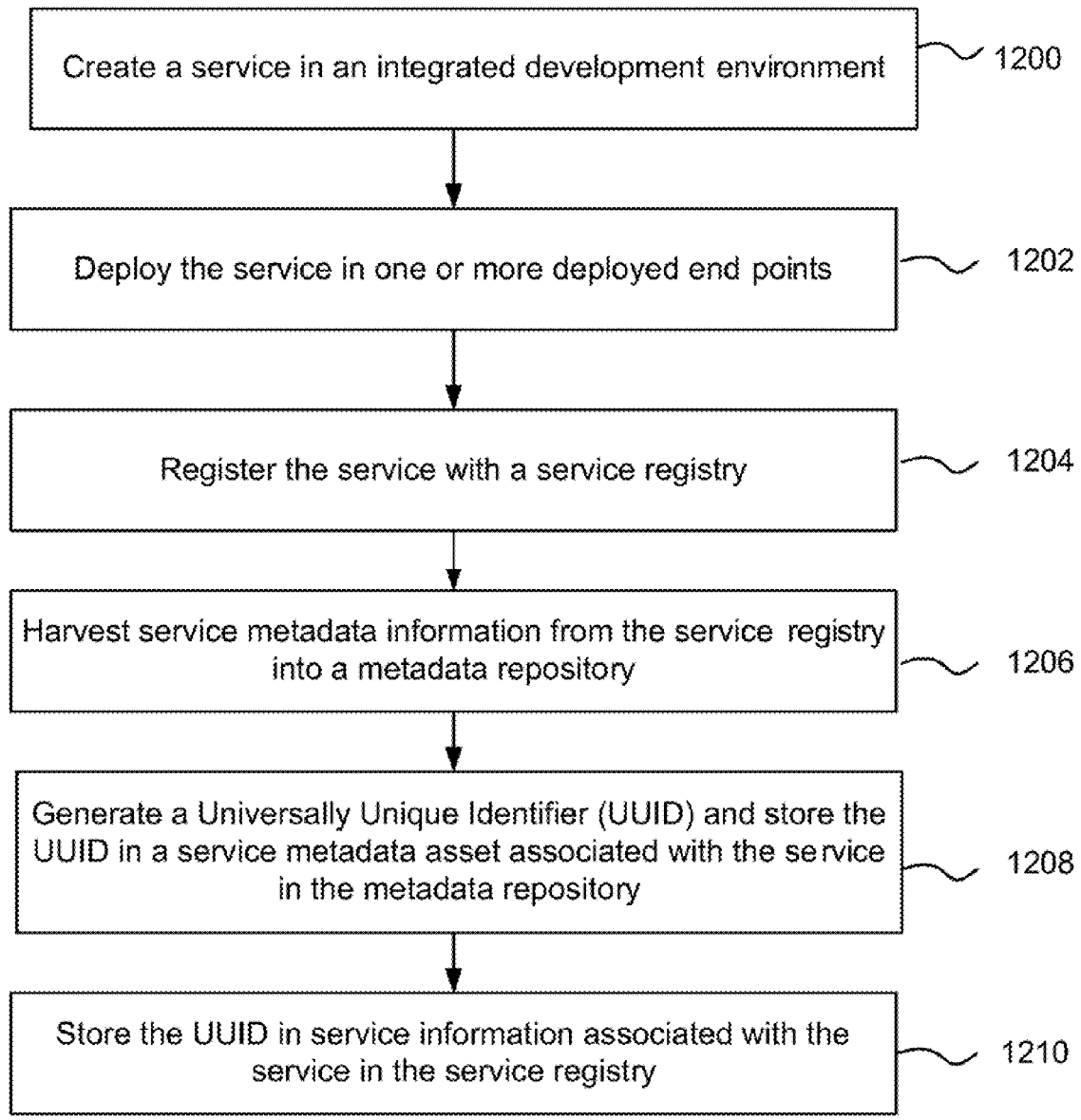
FIG. 12 shows a flowchart for a method for creating a Universally Unique Identifier for a service, in accordance with an embodiment.

In accordance with one embodiment, FIG. 12 shows a flowchart for a method for creating a Universally Unique Identifier (UUID) for a service. In step 1200, a service is created in an integrated development environment. In step 1202, the service is deployed in one or more end points. In step 1204, the service is registered with a service registry. In step 1206, service metadata is harvested from the service registry into a metadata repository. In step 1208, a universally unique identifier (UUID) is generated and stored in a service metadata asset associated with the service in the metadata repository. In step 1210, the UUID is hidden in service information associated with the service in the service registry.

Publishing a Service from the Metadata Repository to the Service Registry

Figure 13:
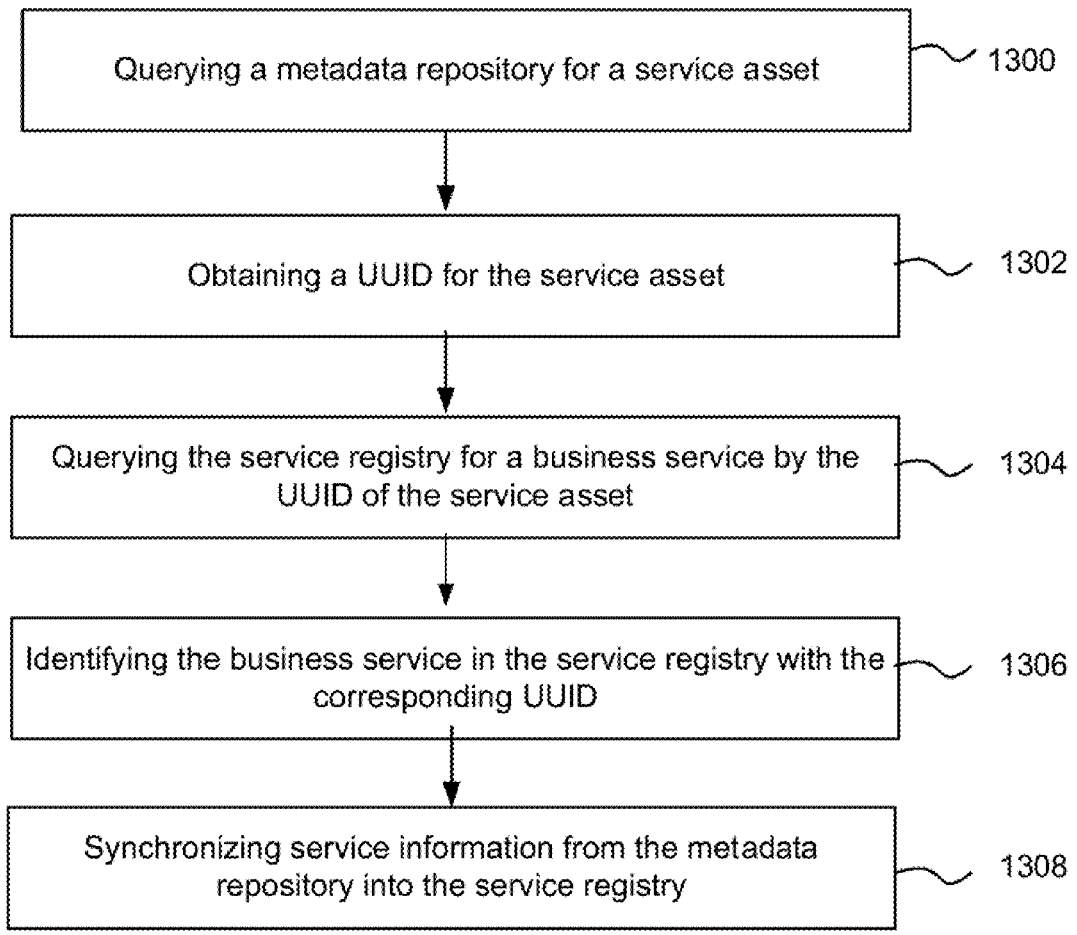
FIG. 13 shows a flowchart for a method for publishing service metadata from a metadata repository into a service registry, in accordance with an embodiment.

In accordance with one embodiment, FIG. 13 shows a flowchart for a method for publishing service metadata from a metadata repository into a service registry. In step 1300, a metadata repository is queried for a service asset. In step 1302, a UUID is obtained for the service asset. In step 1304, the service registry is queried for a business service by the UUID of the service asset. In step 1306, the business service is identified in the service registry with the corresponding UUID. In step 1308, the service information is synchronized from the metadata repository into the service registry.

In one embodiment, a unique service identifier that tracks services across registry boundaries is used to track business services. In one embodiment, the unique service identifier is an asset UUID. The asset UUID is created using UDDI tModels for WSDL port types and WSDL binding. A registry manager supports services in the metadata repository to be searched by published date and published registries. In one embodiment, the service registry can use the unique service identifier to associate the service with a new business entity.

Publishing a service from the metadata repository to the service registry begins with a service in the metadata repository. In order to publish the service to the service registry, create the business service in the service registry if the service does not already exist, otherwise update the currently existing business service. Asset UUID is used as a unique Service Identifier that tracks services across Registry boundaries. UDDI tModels are created for WSDL Port-types and WSDL Binding. UDDI Binding Templates are created as well. A registry manager supports services in metadata repository to be searched by published date and published registries. Finally, the service is published to the service registry with a new business entity relationship. A relationship is then created between the service in the service registry and the new business entity.

Publishing a Service from the Service Registry to the Metadata Repository

Figure 14:
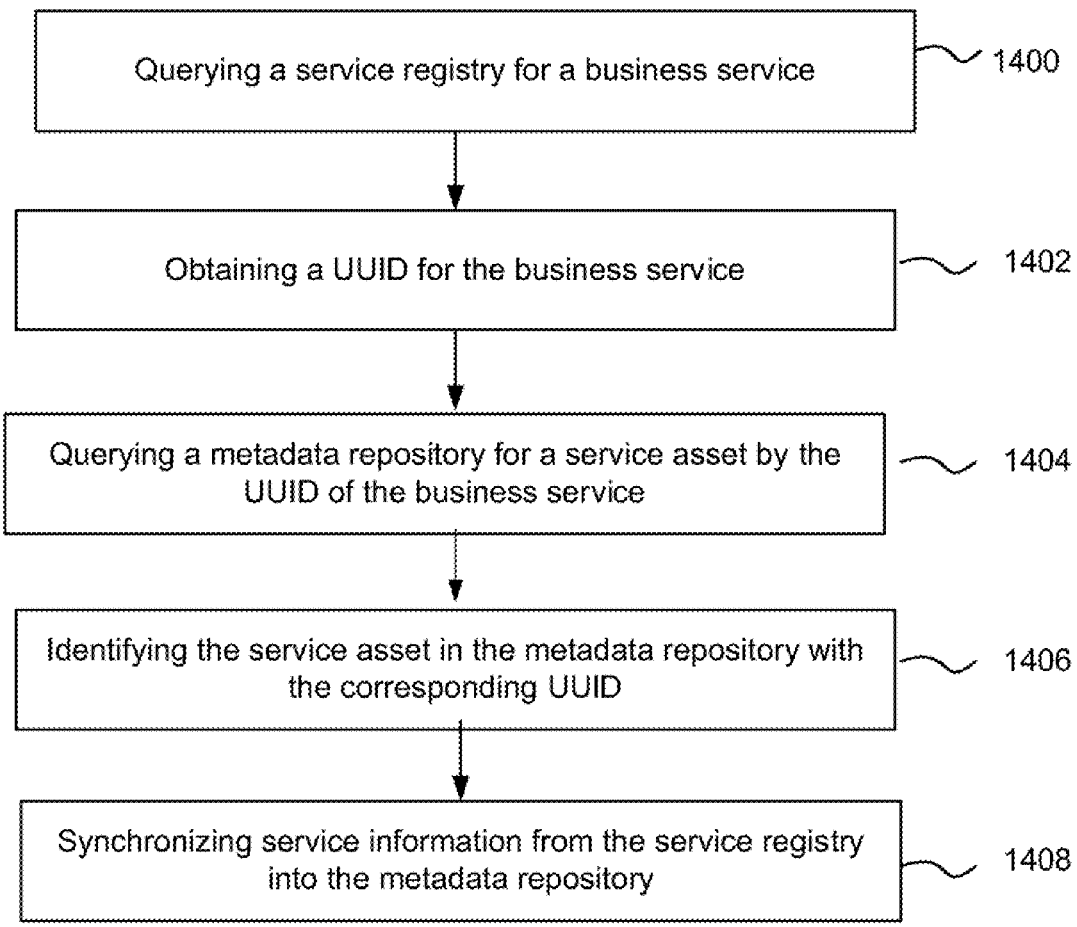
FIG. 14 shows a flowchart for a method for receiving service metadata from a service registry into a metadata repository, in accordance with an embodiment.

In accordance with one embodiment, FIG. 14 shows a flowchart for a method for receiving service metadata from a service registry into a metadata repository. In step 1400, a service registry is queried for a business service. In step 1402, a universally unique identifier (UUID) is obtained for the business service. In step 1404, a metadata repository is queried for a service asset by the UUID of the business service. In step 1406, the service asset in the metadata repository is correlated with the corresponding UUID. In step 1408, service information from the service registry is synchronized into the metadata repository.

In accordance with one embodiment, a UDDI access point of a service is changed in the service registry. The changed service is received into the metadata repository from the service registry. The service is identified using the UUID. An Endpoint asset is created in the metadata repository and related using an "Accessible at" relationship. A new binding template with a UDDI Access Point is added into the service registry. The service is added into the metadata repository from the service registry and identified using UUID. A second endpoint asset can be created and related using an "Accessible at" relationship.

In one embodiment, the service endpoint asset is updated with performance metrics in the metadata repository. A service is monitored by a service management application. Performance metrics are published to the service registry using the service management tool. The performance metrics are displayed in the service registry. A service along with the performance metrics is received into the metadata repository. A service endpoint asset is created in the metadata repository with the Performance metrics.

In one embodiment, a service in the metadata repository is set to a particular asset lifecycle stage. The service is synchronized to the service registry. The service registry shows the asset lifecycle stage. The asset lifecycle stage in the service registry is changed. The service is received back to the metadata repository. The metadata repository shows the updated Asset Lifecycle Stage.

In one embodiment, the service in the metadata repository is associated with a WS-Policy Asset. The service is synchronized to the service registry. The service registry then shows the policy attached to the service. In one embodiment, the service is synchronized using the process described in U.S. patent application Ser. No. 12/032,546, assigned to the owner of the present invention and incorporated herein by reference.

The registry manager provides a framework where metadata can be managed between the metadata repository and any UDDI-compliant registries based on UDDI v3 protocol. In one embodiment, the registry manager provides a number of services. The registry manager publishes a set of services and its related assets from the metadata repository to a service registry. The metadata repository receives a set of services and its related assets from a service registry to a metadata repository. The registry manager publishes events for each published service. The registry manager provides an interface to publish/receive services that will be invoked by metadata repository Servlets, business process management workflows, command line utility, etc. The registry manager provides a set of registry manager flows meant to automate the registry metadata based on events triggered by a metadata repository event manager component. The registry manager provides an event-driven framework to detect changes made to a UDDI registry and automatically synchronize the metadata from a UDDI registry to the metadata repository.

In accordance with one embodiment, the metadata repository Façade layer interposes between the metadata repository and the registry manager for the creation and reading of services. There are several ways to accomplish this function, including the UDDI API, the metadata interoperability framework (MDIF), the REX model, and a hybrid model including MDIF and REX. The scope of the registry manager component is to move and manage the metadata between metadata repository and the service registry, and not to map the internal metadata meta-model of metadata repository to be compliant to UDDI. For Non-web services supported by enterprise service buses such as Java Message Service (JMS), Message Format Language (MFL) etc., MDIF has mapped the metadata and the assets created from the service registry to metadata repository may look consistent. In one embodiment, MDIF maps source code management (SCM) references to artifact stores.

The UDDI Façade layer takes care of interacting with the service registry to create and read assets. In one embodiment, this can be accomplished with UDDI4J, RUDDI, and JAX-RPC. In one embodiment, stubs are directly generated based on the UDDI WSDL contract implemented by the UDDI registries.

In one embodiment, the UDDI XML Schema v3 is used as the internal model. In one embodiment, XMLBeans are used to generate Java classes which will be used by the registry manager to represent the internal metadata. This also shields from the UDDI API being used because it is possible to change the UDDI API without impacting the metadata repository Façade.

The registry manager manages the metadata repository-service registry integration and serves as the entry point for the external tools and Workflow engine. The registry configuration manager manages the metadata repository-service registry integration configuration data and encapsulates the configuration from multiple sources such as XML files/metadata repository System settings, etc.

In one embodiment, the registry manager has several capabilities. The repository manager publishes a set of Services and related assets from a metadata repository to a service registry. The registry manager receives a set of Services and related assets from a service registry to a metadata repository. The registry manager uses a metadata repository Event Manager to publish events for each published service.

The registry manager provides an interface to publish/receive Services that will be invoked by metadata repository Servlets, BPM Workflows, Command line utility, etc. The registry manager provides a set of registry manager Flows meant to automate the Registry metadata based on Events triggered by the metadata repository Event Manager component. The registry manager provides an Event-driven framework to detect changes made to a service registry and automatically synchronize the metadata from a service registry to a metadata repository.

The publish manager orchestrates the publish activities by interacting with the Façade layers. The receive manager orchestrates the receive activities by interacting with the Façade layers. The metadata repository Façade acts as the glue layer between metadata repository API and the registry manager. In one embodiment, the metadata repository Façade is a metadata repository Façade. The UDDI façade acts as the glue layer between UDDI API and the registry manager.

In one embodiment, services are mapped as per the technical note on "Using WSDL in a service registry, Version 2.0.2," from the OASIS Technical Committee UDDI Specification, and incorporated herein by reference in its entirety.

In accordance with one embodiment, in order to perform endpoint mapping, UDDI bindingTemplate is mapped to metadata repository AssetType Endpoint: Web Service. UDDI bindingTemplate->accessPoint is mapped to a string that points to a URL (HTTP or not) and is contained in Endpoint instance—which also leads to WSDL, port, binding and portType. In one embodiment, a metadata interoperability framework (MDIF) maps the Endpoint information to Binding AssetType (Web service, JMS, FTP etc.). AssetType enables a user to set the Endpoint information since the MDIF asset uses CMF to store the Endpoint information which the user cannot set manually.

One embodiment provides WS-Policy Mapping. A metadata service bus (ESB) supports WS-Policy in the following ways: the ESB decorates the WS-Policy statements embedded in WSDL. The ESB uses the WS-Policy Resources and refers this from the WSDL. The ESB refers WS-Policy resources from Proxy and Business Services. In one embodiment, an ESB UDDI Publish module is designed such that the effective WSDL referred in the UDDI binding Template will have a reference to an HTTP URL that lets the client download the WS-Policy documents hosted by the ESB Server.

In accordance with one embodiment, the registry manager supports the following mapping: since the ESB Host and Port is known, the effective WSDL which points back to the ESB server has the WS-Policy references. In one embodiment, the UDDI Business Service entities have Policy mapped as per the W3C specification Web Services Policy 1.5—Attachment, section 6, "Attaching Policies using UDDI," incorporated herein by reference in its entirety. One embodiment supports the WS-Policy references hosted by a metadata repository and source code management systems.

In accordance with one embodiment, business entity mapping is performed. UDDI Business Entities can be mapped to a metadata repository Business Entity Asset Type. When publishing the metadata repository Services to UDDI, if the Services are related to the Business Entity assets, these assets can be mapped to UDDI Business Entity. When reading the Services from UDDI, each UDDI Business Entity can yield a metadata repository Business Entity and is automatically related to the metadata repository Services.

In accordance with one embodiment, XMLBeans are generated and used to encapsulate configuration information. A registry manager integrates a metadata repository with a service registry bi-directionally so that the metadata from either of these products can flow in either direction.

In accordance with one embodiment, service metadata entities handled by the registry manager include pre-bundled services, both metadata interoperability framework (MDIF) and non-MDIF services, as well as custom services of any asset type in the metadata repository developed by users; business entities that provide business services; and endpoint assets that are linked to the services that provide access point to the services. There can be multiple endpoints that can be tagged as "staging" or "production" and are mapped to a UDDI binding template appropriately.

Enterprise repository categorizations that are mapped to UDDI tModels are also handled by the registry manager. When a categorization is applied to a service asset, an appropriate entry is added to the UDDI category bag and is linked to the appropriate taxonomy tModel. In accordance with one embodiment, these tModels are automatically loaded in the service registry the first time they are encountered or can be loaded manually by the tool.

Furthermore, the registry manager can manage WS-Policy assets that are linked to either a service or an endpoint asset are understood and published/received based on the OASIS WS-Policy Attachment specification; performance metrics that are deposited by an SOA management application into a service in the service registry are synchronized back to the endpoint asset in the metadata repository; and service registration status and active status are added as items to the category bag of the business service in service registry when the services are published to service registry.

Figure 15:
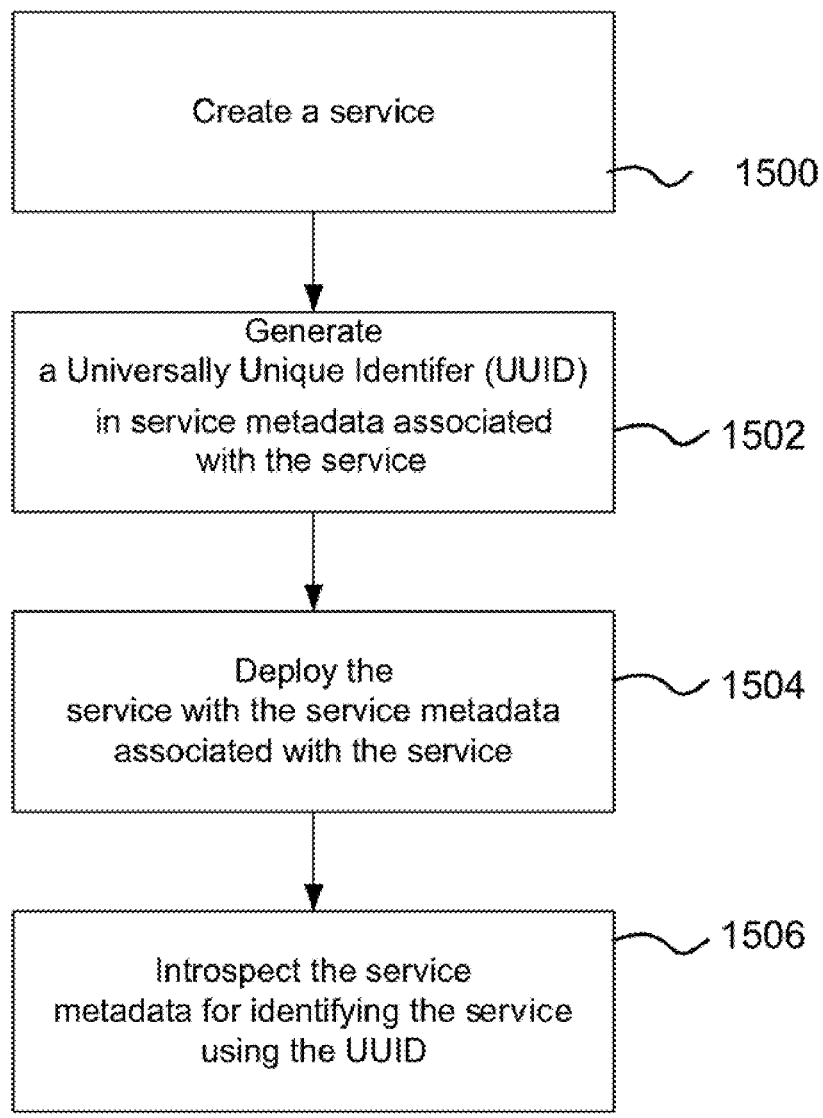
FIG. 15 shows a flowchart for a method for creating a Universally Unique Identifier for a service, in accordance with an embodiment.

In accordance with a specific embodiment, FIG. 15 illustrates a method for generating a universally unique identifier to identify a service. In step 1500, a service is created. In step 1502, a universally unique identifier (UUID) is generated and stored in service metadata associated with the service. In step 1504, the service is deployed with the service metadata associated with the service. In step 1506, the service metadata is introspected in order to identify the service using the UUID.

In accordance with a specific embodiment, a service metadata repository tracks service design, management, policy, security, and testing artifacts. The service metadata repository stores service metadata which contains a Unique Universal Identifier (UUID). Design tools include integrated development environments, service modeling tools, dependency tracking tools, policy creation tools, management tools, and other tools that assist in the design of services. Design tools are used to create and edit service metadata, which contains a UUID. A source code management (SCM) system provides service deployment capabilities, in one embodiment through binding with external development environments. The source code management system stores service metadata, which contains a UUID. Deployment tools provide service deployment capabilities, in one embodiment through binding with external development environments. The deployment tools are used to deploy service metadata, which contains a UUID. Testing tools provide a developer/designer the ability to create and implement a test plan and testing scenarios. Testing tools are used to test service metadata, which contains UUID. A UUID can be used to determine whether two services present in more than one environment are the same service or a different service. A service metadata repository can compare a UUID with another UUID to determine whether service metadata being stored in the service metadata repository is the same as service metadata being edited in the design tools. The deployment tools can compare a UUID with another UUID to determine whether service metadata being deployed by the deployment tools is the same as service metadata being edited in the design tools. The deployment tools can compare a UUID with another UUID to determine whether service metadata being deployed by the deployment tools is the same as service metadata being stored in the source code management system. Testing tools can compare a UUID with additional UUIDs to determine whether service metadata being tested by the testing tools is the same service metadata being deployed by the deployment tools and the same as service metadata being edited in the design tools. Design tools, Deployment tools, source code management system, and Testing tools can each correlate the UUIDs of specific services within their environment with corresponding service metadata information stored in service metadata repository.

Figure 16:
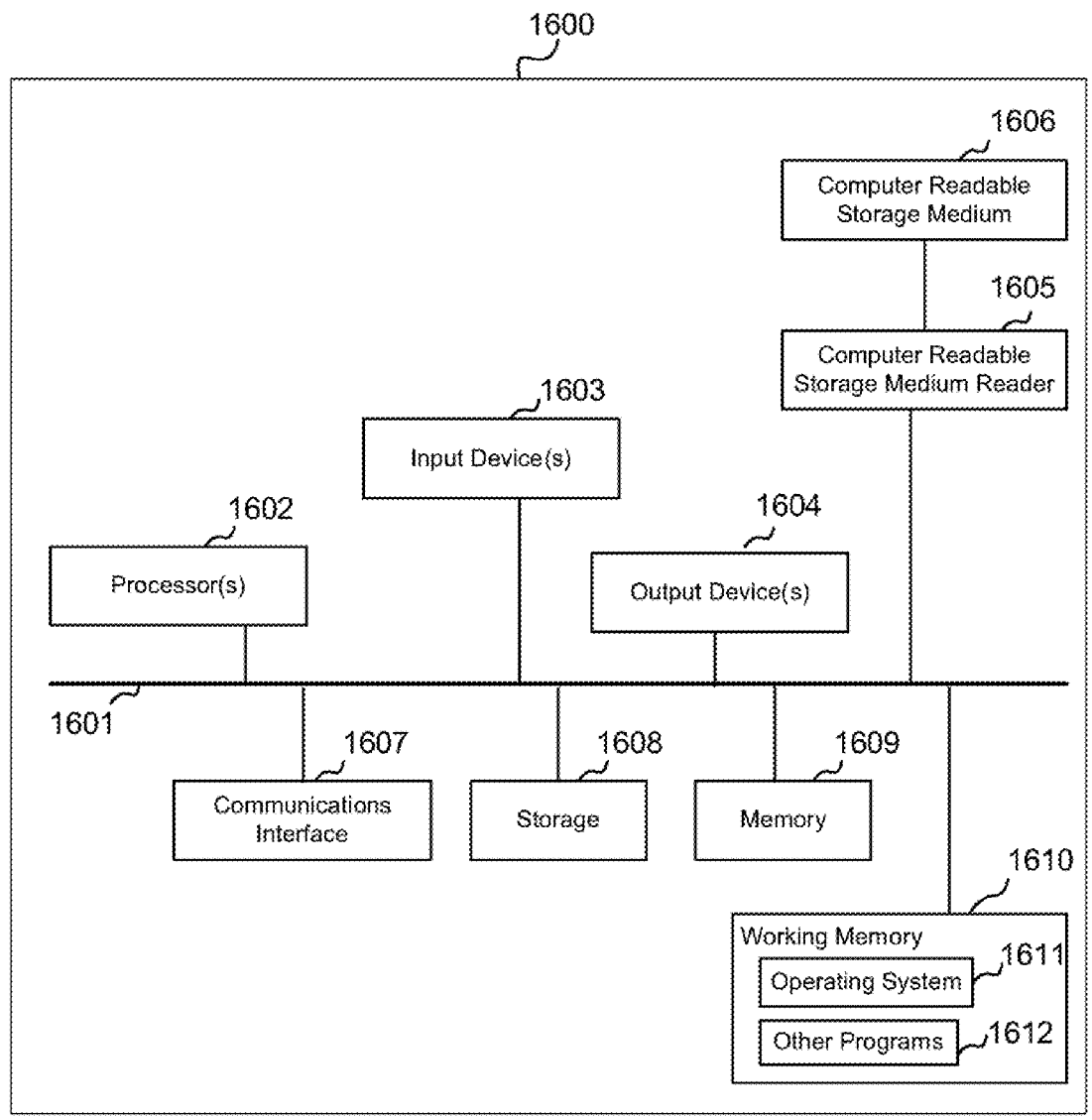
FIG. 16 is a hardware block diagram of an example computer system, which may be used to embody one or more components, in accordance with one embodiment.

FIG. 16 illustrates an exemplary processing system 1600, which can comprise one or more of the elements of FIG. 1 and FIG. 5. While other alternatives might be utilized, it can be presumed that the components of the systems of FIG. 1 and FIG. 5 are implemented in hardware, software or some combination by one or more computing systems consistent therewith, unless otherwise indicated.

Computing system 1600 comprises components coupled via one or more communication channels (e.g., bus 1601) including one or more general or special purpose processors 1602, such as a Pentium®, Centrino®, Power PC®, digital signal processor ("DSP"), and so on. System 1600 components also include one or more input devices 1603 (such as a mouse, keyboard, microphone, pen, and so on), and one or more output devices 1604, such as a suitable display, speakers, actuators, and so on, in accordance with a particular application. (It can be appreciated that input or output devices can also similarly include more specialized devices or hardware/software device enhancements suitable for use by the mentally or physically challenged.)

System 1600 also includes a computer readable storage media reader 1605 coupled to a computer readable storage medium 1606, such as a storage/memory device or hard or removable storage/memory media; such devices or media are further indicated separately as storage 1608 and memory 1609, which may include hard disk variants, floppy/compact disk variants, digital versatile disk ("DVD") variants, smart cards, read only memory, random access memory, cache memory, and so on, in accordance with the requirements of a particular application. One or more suitable communication interfaces 1607 may also be included, such as a modem, DSL, infrared, RF or other suitable transceiver, and so on for providing inter-device communication directly or via one or more suitable private or public networks or other components that may include but are not limited to those already discussed.

Working memory 1610 further includes operating system ("OS") 1611 elements and other programs 1612, such as one or more of application programs, mobile code, data, and so on for implementing system 1600 components that might be stored or loaded therein during use. The particular OS or OSs may vary in accordance with a particular device, features or other aspects in accordance with a particular application (e.g. Windows®, WindowsCE™, Mac™, Linux, Unix or Palm™ OS variants, a cell phone OS, a proprietary OS, Symbian™, and so on). Various programming languages or other tools can also be utilized, such as those compatible with C variants (e.g., C++, C#), the Java™ 2 Platform, Enterprise Edition ("J2EE") or other programming languages in accordance with the requirements of a particular application. Other programs 1612 may further, for example, include one or more of activity systems, education managers, education integrators, or interface, security, other synchronization, other browser or groupware code, and so on, including but not limited to those discussed elsewhere herein.

When implemented in software (e.g. as an application program, object, agent, downloadable, servlet, and so on in whole or part), a learning integration system or other component may be communicated transitionally or more persistently from local or remote storage to memory (SRAM, cache memory, etc.) for execution, or another suitable mechanism can be utilized, and components may be implemented in compiled or interpretive form. Input, intermediate or resulting data or functional elements may further reside more transitionally or more persistently in a storage media, cache or other volatile or non-volatile memory, (e.g., storage device 608 or memory 609) in accordance with a particular application. Embodiments can include computer-based methods and systems which may be implemented using a conventional general purpose computer(s) or a specialized digital computer(s) or microprocessor(s), programmed according to the teachings of the present disclosure. Appropriate software coding can readily be prepared by programmers based on the teachings of the present disclosure.

Embodiments can include computer-based methods and systems which may be implemented using a conventional general purpose computer(s) or a specialized digital computer(s) or microprocessor(s) or virtual machine(s), programmed according to the teachings of the present disclosure. Appropriate software coding can readily be prepared by programmers based on the teachings of the present disclosure.

Embodiments can include a computer readable medium, such as a computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling the hardware of a computer, such as a general purpose/specialized computer(s) or a microprocessor(s), and for enabling them to interact with a human user or other mechanism utilizing the results of the present invention. Such software may include, but is not limited to, device drivers, operating systems, virtual machines, virtual operating systems, execution environments/containers, and user applications.

Embodiments can include providing code for implementing processes. The providing can include providing code to a user in any manner. For example, the providing can include providing the code on a physical media to a user; or any other method of making the code available.

Embodiments can include a computer-implemented method for transmitting the code which can be executed at a computer or a virtual machine to perform any of the processes of embodiments. The transmitting can include transfer through any portion of a network, such as the Internet; through wires; or any other type of transmission. The transmitting can include initiating a transmission of code; or causing the code to pass into any region or country from another region or country. A transmission to a user can include any transmission received by the user in any region or country, regardless of the location from which the transmission is sent.

The foregoing description of preferred embodiments has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. A method for creating a Universally Unique Identifier (UUID) for a web service, comprising:
   creating a web service and a set service metadata associated with said web service in an integrated development environment;
   deploying the web service and the service metadata in one or more end points that define a uniform resource identifier (URI) where the web service can be contacted;
   registering the web service and the service metadata with a service registry;
   harvesting the service metadata from the service registry into a metadata repository stored on a computing device;
   generating a universally unique identifier (UUID) that uniquely identifies the web service between multiple distributed and heterogeneous systems, and storing the UUID in a service metadata asset associated with the web service in the metadata repository, wherein the service metadata asset includes a data structure representing a service type, binding and wire protocols of said web service;
   storing the UUID in the service metadata associated with the web service in the service registry; and
   periodically synchronizing the service metadata between the service registry and the metadata repository by employing the UUID associated with the web service.

2. The method of claim 1, wherein the web service is tracked using the UUID.

3. The method of claim 1, wherein the UUID is stored in a UDDI tModel in the service registry.

4. The method of claim 1, wherein the service registry supports Universal Description Discovery and Integration (UDDI).

5. The method of claim 1, wherein the web service is published to a plurality of service registries, and wherein the web service has the same UUID in each service registry of said plurality of service registries.

6. The method of claim 1, wherein when an enterprise service bus publishes metrics to a monitoring system, the UUID is sent along with the metrics data.

7. The method of claim 1, wherein correlating the UUID enables service information to be synchronized between systems.

8. The method of claim 1, wherein when services are deployed, concrete deployment information is updated in the metadata repository and correlated using the UUID.

9. The method of claim 1, further comprising:
   generating a finger print using an algorithm to uniquely identify an artifact, wherein the finger print is used in combination with the UUID to identify said artifact.

10. A non-transitory computer readable storage medium storing a set of instructions that are executed by one or more processors to perform a sequence of steps comprising:

creating a web service and a set service metadata associated with said web service in an integrated development environment;

deploying the web service and the service metadata in one or more end points that define a uniform resource identifier (URI) where the web service can be contacted;

registering the web service and the service metadata with a service registry;

harvesting the service metadata from the service registry into a metadata repository;

generating a universally unique identifier (UUID) that uniquely identifies the web service between multiple distributed and heterogeneous systems, and storing the UUID in a service metadata asset associated with the web service in the metadata repository, wherein the service metadata asset includes a data structure representing a service type, binding and wire protocols of said web service;

storing the UUID in the service metadata associated with the web service in the service registry; and periodically synchronizing the service metadata between the service registry and the metadata repository by employing the UUID associated with the web service.

11. The non-transitory computer readable storage medium of claim 10 wherein the web service is tracked using the UUID.

12. The non-transitory computer readable storage medium of claim 10, wherein the UUID is stored in a UDDI tModel in the service registry.

13. The non-transitory computer readable storage medium of claim 10, wherein the service registry supports Universal Description Discovery and Integration (UDDI).

14. The non-transitory computer readable storage medium of claim 10, wherein the web service is published to a plurality of service registries, and wherein the web service has the same UUID in each service registry of said plurality of service registries.

15. The non-transitory computer readable storage medium of claim 10, wherein when an enterprise service bus publishes metrics to a monitoring system, the UUID is sent along with the metrics data.

16. The non-transitory computer readable storage medium of claim 10, wherein correlating the UUID enables service information to be synchronized between systems.

17. The non-transitory computer readable storage medium of claim 10, wherein when services are deployed, concrete deployment information is updated in the metadata repository and correlated using the UUID.

18. The non-transitory computer readable storage medium of claim 10, further comprising:

generating a finger print using an algorithm to uniquely identify an artifact, wherein the finger print is used in combination with the UUID to identify said artifact.

19. A system comprising one or more hardware processors and a physical memory containing instructions, said instructions executable by the one or more hardware processors to perform a set of steps comprising:

creating a web service and a set service metadata associated with said web service in an integrated development environment;

deploying the web service and the service metadata in one or more end points that define a uniform resource identifier (URI) where the web service can be contacted;

registering the web service and the service metadata with a service registry;

harvesting the service metadata from the service registry into a metadata repository;

generating a universally unique identifier (UUID) that uniquely identifies the web service between multiple distributed and heterogeneous systems, and storing the UUID in a service metadata asset associated with the web service in the metadata repository, wherein the service metadata asset includes a data structure representing a service type, binding and wire protocols of said web service;

storing the UUID in the service metadata associated with the web service in the service registry; and periodically synchronizing the service metadata between the service registry and the metadata repository by employing the UUID associated with the web service.

* * * * *

UNITED STATES PATENT AND TRADEMARK OFFICE
CERTIFICATE OF CORRECTION

| | | |
|---|---|---|
| PATENT NO. | : 7,996,434 B2 | Page 1 of 1 |
| APPLICATION NO. | : 12/370030 | |
| DATED | : August 9, 2011 | |
| INVENTOR(S) | : Palanisamy et al. | |

It is certified that error appears in the above-identified patent and that said Letters Patent is hereby corrected as shown below:

On sheet 17 of 18, in figure 15, Box No. 1502, line 2, delete "Identifer" and insert -- Identifier --, therefor.

In column 3, line 47, delete "UUDI" and insert -- UDDI --, therefor.

In column 7, line 38, delete "1 104." and insert -- 1104. --, therefor.

Signed and Sealed this
Fifteenth Day of November, 2011

David J. Kappos
*Director of the United States Patent and Trademark Office*